United States Patent [19]

Hoefer et al.

[11] Patent Number: 4,772,670

[45] Date of Patent: * Sep. 20, 1988

[54] EMULSION POLYMERIZATION COMPOSITIONS CONTAINING 2-ALKYL-1-ALKANOL POLYGLYCOLETHERS

[75] Inventors: Rainer Hoefer, Duesseldorf; Bernd Wegemund, Haan; Horst-Juergen Krause, Duesseldorf, all of Fed. Rep. of Germany

[73] Assignee: Henkel Kommanditgesellschaft auf Aktien, Duesseldorf, Fed. Rep. of Germany

[ * ] Notice: The portion of the term of this patent subsequent to Mar. 10, 2004 has been disclaimed.

[21] Appl. No.: 900,580

[22] Filed: Aug. 26, 1986

[30] Foreign Application Priority Data

Aug. 26, 1985 [DE] Fed. Rep. of Germany ....... 3530405

[51] Int. Cl.$^4$ ............................................... C08F 2/30

[52] U.S. Cl. .................................... 526/209; 526/210; 526/201

[58] Field of Search .............................. 526/209, 210; 252/188.31

[56] References Cited

U.S. PATENT DOCUMENTS

| | | | |
|---|---|---|---|
| 3,251,816 | 5/1966 | Furendal | 526/209 |
| 3,381,059 | 4/1968 | Harris et al. | 526/209 |
| 4,648,984 | 3/1987 | Krause et al. | 252/174 |

Primary Examiner—Joseph L. Schofer
Assistant Examiner—Peter F. Kulkosky
Attorney, Agent, or Firm—Ernest G. Szoke; Henry E. Millson, Jr.

[57] ABSTRACT

Use of, and composition containing the reaction products of primary 2-alkyl-1-alkanols containing from 12 to 36 carbon atoms with ethylene oxide and/or propylene oxide as emulsifiers or co-emulsifiers in the emulsion polymerization of ethylenically unsaturated monomers.

14 Claims, No Drawings

EMULSION POLYMERIZATION COMPOSITIONS CONTAINING 2-ALKYL-1-ALKANOL POLYGLYCOLETHERS

BACKGROUND OF THE INVENTION

1. Field of the Invention

This invention relates to 2-alkyl-1-alkanol polyglycolethers, more especially those containing unbranched or phenyl-substituted alkyl groups, as a component of aqueous polymer dispersions and lactices to provide certain desirable properties therefor.

2. Statement of Related art

Commonly owned copending application Ser. No. 868,903, filed June 5, 1985, now U.S. Pat. No. 4,648,984 relates to 2-benzyl-1-alkanol polyglycolethers, to their production and to their use in detergents and cleaning preparations, which provide favorable to superior washing properties for these products, particularly when used in relatively high concentrations.

In addition, 2-alkylalkanols containing a lateral alkyl group are known compounds. Products such as these can conveniently be prepared by the so-called Guerbet reaction, i.e., the dimerization of alcohols or alcohol mixtures.

DESCRIPTION OF THE INVENTION

Other than in the operating examples, or where otherwise indicated, all numbers expressing quantities of ingredients or reaction conditions used herein are to be understood as modified in all instances by the term "about."

The present invention seeks to solve the problem of obtaining improvements in aqueous polymer dispersions or latices. It is known that aqueous polymer dispersions and corresponding lactices obtained by emulsion polymerization have numerous industrial applications. For example, they are used as binder dispersions which are exposed to various stresses and strains during transport, storage and use. Polymer dispersions of this type are, basically, highly sensitive unstable two-phase systems which are subjected to numerous destabilizing influences under the conditions under which they are used in practice. To the expert on polymers, their stabilizaton, i.e. in particular the prevention of undesirable creaming or coagulation, involves a complex set of problems to which various solutions have been proposed. Polymer dispersions and emulsions of this type have to be protected, for example, against coagulation by freezing and thawing, additions of electrolytes, or the shear and other forces occuring during processing into emulsion paints, coating compositions, emulsion plasters, leather finishes, polishes, adhesives, textile auxiliaries and other applications known to those skilled in this art. Numerous surfactants are already available for these stabilizing functions. Thus, anionic surfactants, nonionic surfactants or mixtures thereof are frequently used. Unfortunately, the known systems are often unsatisfactory with respect to their biodegradability in wastewaters.

In general, it is precisely for use in emulsion polymerization that those skilled in this art are constantly seeking new surfactants which show favorable properties both during preparation of the emulsion and also during polymerization, particularly with respect to the properties of the polymer latex formed. This is all the more so as it is not possible for those skilled in this art to draw any reliable conclusions from the chemical structure of a surfactant as to its properties as a polymerization emulsifier or stabilizer.

The present invention relates to the use of the reaction products of primary 2-alkylalkanols containing from 12 to 36 carbon atoms with ethylene oxide and/or propylene oxide as emulsifiers or coemulsifiers in the emulsion polymerization of ethylenically unsaturated monomers.

2-Alkyl-1-alkanols containing from 12 to 36 carbon atoms, of which from 8 to 20 carbon atoms are preferably in the main chain and from 4 to 16 carbon atoms in the alkyl side chain, are used in accordance with the invention. The main chain is preferably unbranched. The side chain can be unbranched, or it can contain branches, aliphatic rings or phenyl substituents which in turn can be alkyl-substituted.

In one preferred embodiment, the invention relates to aqueous polymer dispersions and latices containing 2-benzyl-1-alkanol polyglycolethers.

2-Benzyl-1-alkanol polyglycolethers are described in copending application Ser. No. 868,903, which is incorporated herein by reference. Other 2-alkyl-1-alkanol polyglycolethers can also be produced by the processes described therein.

Preferred for use in the compositions of the present invention are 2-benzyl-1-alkanol polyglycolethers corresponding to the following general formula

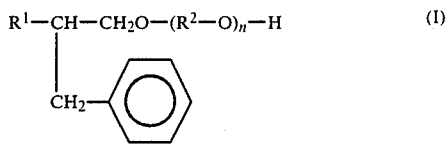

$$R^1-CH-CH_2O-(R^2-O)_n-H \qquad (I)$$

in which $R^1$ is a $C_6$–$C_{23}$ alkyl group, $R^2$ is a $C_2$–$C_6$ alkylene group and n is an integer of from 1 to 100.

$R^1$ is preferably a $C_8$–$C_{18}$ alkyl group. $R_2$ is preferably an ethylene group or propylene group, i.e. the expression ($R^2$—O) represents an ethylene glycolether group (EO) and/or a propylene glycolether group (PO). Accordingly, a compound corresponding to formula I may contain only EO-groups or only PO-groups or both groups in any order. The value of n is preferably from 5 to 80 and more preferably from 8 to 50.

The following examples of compounds in which x and y independently of one another are integers of from 1 to 100 and $x+y=n$:

2-benzyloctanol-(EO)$_x$
2-benzyldecanol-(EO)$_x$
2-benzyldodecanol-(EO)$_x$
2-benzyltetradecanol-(EO)$_x$
2-benzylhexadecanol-(EO)$_x$
2-benzyloctadecanol-(EO)$_x$
2-benzyldecanol-(EO)$_x$-(PO)$_y$
2-benzyldodecanol-(EO)$_x$-(PO)$_y$
2-benzyltetradecanol-(EO)$_x$-(PO)$_y$
2-benzylhexadecanol-(EO)$_x$(PO)$_y$
2-benzyloctanol-(PO)$_y$-(EO)$_x$
2-benzyldecanol-(PO)$_y$-(EO)$_x$
2-benzyldodecanol-(PO)$_y$-(EO)$_x$
2-benzyltetradecanol-(PO)$_y$-(EO)$_x$ The production of the above preferred compounds used as a component of the aqueous polymer dispersions and latices of the invention is carried out in a first stage by heating a mixture of alkanol and benzyl alcohol to a temperature of from 150° to 280° C. in the presence of an alkaline-reacting alkali metal compound (mixed GUERBET reaction). In order to suppress a competing homologous GUERBET reaction of the alkanol, the benzyl alcohol is advantageously used in excess. This excess may be up to a 10 fold molar excess, although it is preferably a 2 to 3 fold molar excess. Suitable alkaline-reacting catalysts include the hydroxides, carbonates, borates, silicates and phosphates of potassium or sodium, and alkali metal compounds which react with the water of reaction form to form the hydroxides, for example alcoholates, oxides, amides, and hydrides. Potassium hydroxide is preferably used in quantities of from 0.1 to 0.25 mole percent, based on the alkanol used.

The yield may be considerably increased if hydrogenation or dehydrogenation catalysts are additionally present in finely divided form. Examples of catalysts such as these are metals of Secondary Groups I and VIII of the Periodic System of Elements, such as Cu, Fe, Ni, Co, Pt and Pd, and also mixed catalysts as well as salts of Fe, Zn, Co, Mn and Cr. Cu, Ni and platinum metals and their alloys have proved to be particularly suitable. These dehydrogenation catalysts may be added in quantities of from 0.1 to 5% by weight and preferably in quantities of from 0.2 to 2% by weight, based on the weight of the reaction mixture.

The GUERBET reaction takes place at temperatures of from 150° to 280° C. and preferably at temperatures of from 180° to 250° C. At temperatures above the boiling point of the alcohols (octanol 194° C., decanol 229° C., benzyl-alcohol 205° C.), the reaction is carried out in a pressure vessel. The water formed during the reaction is preferably removed from the reaction mixture, for example by distillation, in which case the alcohol serves as an entraining agent. The azeotrope distilled off is dehydrated before being returned into the reaction mixture, dehydrating agents preferably being added due to the slight difference in density between benzyl alcohol and water. Suitable dehydrating agents are, for example, salts which bind water of crystallization, such as sodium sulfate, and also concentrated solutions of these salts.

Upon completion of the reaction, which takes from 0.5 to 5 hours, depending on the reaction conditions used, the catalyst is separated off, which can be done by decantation or filtration. Any alkali still dissolved can be neutralized beforehand. In addition to unreacted starting material, particularly excess benzyl alcohol, the reaction mixture generally contains aliphatic GUERBET alcohols which are formed through autocondensation of the alkanols with each other. The 2-benzyl-1-alkanols are isolated from this mixture by fractional distillation. In instances where the aliphatic GUERBET alcohols present do not interfere and may be used in the form of their alkoxylates, it is sufficient to separate off the excess benzyl alcohol and other secondary products. The secondary products formed are primarily alkali metal salts of acids, particularly potassium benzoate, which is formed by dehydrogenation of the benzyl alcohol. These salts, which are insoluble in the reaction mixture, may readily be separated off together with the catalyst either mechanically or by washing out with water.

The 2-benzyl-1-alkanol formed in the first stage is reacted with alkylene oxides in a generally known manner to form the corresponding polyglycolethers. Suitable alkylene oxides are ethylene oxide and propylene oxide and also mixtures thereof. In addition, the alkylene oxides may be used in a different order, i.e. the 2-benzylalkanols can be reacted first with ethylene oxide and then with propylene oxide. The reverse order can also be used, and similarly leads to useful products.

In the same way as the 2-benzyl-1-alkanol polyglycolethers, 2-alkyl-1-alkanol polyglycolethers containing an unbranched alkyl group can be prepared by homologous GUERBET reaction or by mixed GUERBET reaction of primary and branched alcohols using the reaction conditions given above. The reaction products of 2-alkyl-1-alkanols containing from 8 to 20 carbon atoms in the main chain and from 4 to 16 carbon atoms in the alkyl side chain with ethylene oxide and/or propylene oxide are suitable for use in accordance with the invention. In this connection, 2-alkyl-1-alkanols of products derived from unbranched, primary alkanols containing an odd or even number of carbon atoms can be employed. Thus, the dimerization products of fatty alcohols or of the analogous Ziegler alcohols are particularly suitable, in which instance either pure alcohols or, preferably, mixtures thereof can be used.

According to the invention, reaction products of 2-alkyl-1-alkanols with from 5 to 100 moles of ethylene oxide, preferably from 5 to 80 moles of ethylene oxide and more preferably from 8 to 50 moles of ethylene oxide per mole of 2-alkyl-1-alkanol are used in the emulsion polymerizaton. Also, these products can have been additionally reacted with 1 to 20 moles of propylene oxide per mole of reaction product. In this connection, it was found that products containing more than 30 moles of ethylene oxide per mole of reaction product also show favorable properties as the only emulsifier in the compositions of the invention. Thus, favorable sole emulsifiers are for example the reaction products of from 30 to 100 moles of ethylene oxide per mole of 2-alkyl-1-alkanol and more especially per mole of 2-benzyl-1-alkanol. The reaction products of the 2-alkyl-1-alkanols with ethylene oxide, where they have an ethylene oxide content of from 5 to 30 moles per mole of 2-alkyl-1-alkanol, preferably used in combination with anionic or cationic emulsifiers.

The reaction products of 2-alkyl-1-alkanols with ethylene oxide and/or propylene oxide, hereinafter referred to as 2-alkyl-1-alkanol polyglycolethers, used in accordance with the invention, can be used for the emulsion polymerization or numerous ethylenically unsaturated monomers. Thus, according to the invention, the compounds can be used as a component in the emulsion polymerization of monoolefins. Suitable monoolefins are, for example, styrene or other aromatic vinyl compounds such as methylstyrene, propene, isobutene, etc. The emulsifiers of the invention can also be used in the emulsion polymerization of diolefins, particularly when polymers having a glass temperature below room temperature are formed.

Also in accordance with the invention, the present compounds can be used in the emulsion polymerizaton of esters and/or amides of acrylic and/or methacrylic acid. Thus, the compounds can be used in the polymerization of the methyl, ethyl, propyl, isopropyl, butyl, hexyl and/or 2-ethylhexyl esters of acrylic acid and/or methacrylic acid. The present emulsifiers are also suitable for use in the emulsion polymerization of n-alkylamides of acrylic acid and/or methacrylic acid.

Further in accordance with the invention, the 2-alkyl-1-alkanol polyglycolethers can also be used in the emulsion polymerization of vinyl esters. Suitable vinyl esters are vinyl acetate, vinyl propionate, vinyl-2-ethylhexanoate and also higher esters of vinyl alcohol, particularly versatic acid vinyl ester. In another embodiment, the invention relates to the use of the emulsifiers in the polymerizaton of vinyl halides. Preferred vinyl halides are vinyl chloride and vinylidene chloride. The emulsifiers can also be used in the copolymerization of at least one of the above-mentioned monomers with other monomers, optionally even with at least partially water-soluble monomers. Thus, they are suitable for use in the copolymerization of ethylenically unsaturated monomers with acrylonitrile, with methacrylonitrile, and with maleic and fumaric esters, such as di-n-butylmaleate or monobutylmaleate. Moreover, the emulsifiers can also be used in the emulsion polymerization of mixtures of the abovementioned monomers, for example mixtures of acrylates with styrene, ethylene with vinyl acetate, if desired in the presence of vinyl chloride, and also vinyl acetate-versatic acid vinyl ester. Thus, the emulsifiers are suitable for the production of rubber latices in the broadest sense, for example those based on butadiene, isoprene, chlorinated butadienes or chlorinated isoprenes, and those based on copolymers of diolefins with styrene or acrylonitrile.

Also in accordance with the invention, the emulsifiers can be used in the emulsion copolymerization of ethylenically unsaturated, substantially water-insoluble monomers with dissociable, water-soluble monomers. The dissociable, water-soluble monomers make up less than 60% by weight and preferably from 0.5 to 15% by weight of the monomer total. Suitable water-soluble, dissociable monomers are acrylic acid, methacrylic acid, itaconic acid, maleic acid, fumaric acid, semiesters of maleic acid, crotonic acid, vinylphosphonic acid, vinylsulfonic acid and/or 2-acrylamido-2-methylpropanoic acid (AMPS). In addition to the acids, it is also possible to use their salts, for example with alkali metals or ammonia. Other suitable water-soluble, dissociable monomers are basic esters of acrylic acid and/or methacrylic acid, such as for example dimethylaminoethyl methacrylate.

In addition to their use as primary emulsifiers, the 2-alkyl-1-alkanol polyglycolethers can also be combined with other emulsifiers, and such combinations are also in accordance with the invention. Anion-active, nonionic or cation-active emulsifiers can be used for this purpose. Suitable anion-active emulsifiers are soaps of natural or synthetic fatty acids, disproportionated rosin soaps, water-soluble salts of branched monocarboxylic acids, which may also be obtained by the GUERBET reaction, fatty alcohol sulfates, fatty alcohol ethersulfates, alkylphenolether sulfates, alkylbenzene sulfonates, paraffin sulfonates, alkylnaphthalene sulfonates, water-soluble salts of sulfated oils, sulfosuccinic acid semiesters, sulfosuccinic acid diesters, alkylether phosphates, alkylphenolether phosphates, alkylisethionates and/or alkyldiphenylether sulfonates. Suitable nonionic emulsifiers which may be combined with the products used in accordance with the invention are, for example, alkylphenol ethoxylates, fatty acid ethoxylates and/or fatty alcohol ethoxylates. Suitable cation-active emulsifiers are, for example, fatty amine hydrochlorides and/or quaternary ammonium compounds.

The 2-alkyl-1-alkanol polyglycolethers used in accordance with the invention can also be combined with protective colloids.

Suitable protective colloids are water-soluble cellulose ethers, such as methyl cellulose, carboxymethyl cellulose, hydroxyethyl cellulose or partially hydrolyzed polyvinylacetate or partially hydrolyzed copolymers of polyvinylacetate and vinylbutylether.

In the preferred use of the 2-alkyl-1-alkanol polyglycolethers, a preferred ratio by weight between monomers and water is from 1:3 to B 1:1 parts by weight. The emulsifiers are used in a quantity of from 0.5 to 10% by weight and preferably in a quantity of from 1 to 5% by weight, based on the emulsion as a whole. The auxiliaries normally used for emulsion polymerization may be used together with the emulsifiers of the invention. Auxiliaries include, for example, polymerization initiators and accelerators, such as for example potassium or ammonium persulfate, hydrogen peroxide, if desired in combination with reducing agents such as transition metal compounds, in quantities of from 0.05 to 2% by weight. Other standard auxiliaries are buffers, such as sodium hydrogen carbonate, sodium pyrophosphate, or sodium acetate. It is also possible to use molecular weight regulators such as, for example, 2-mercaptoethanol, thioglycolic acid, thioglycolic acid esters of ethylene glycol, glycerol, pentaerythritol, or isopropanol. Using the emulsifiers of the invention the emulsion polymerization can be carried out at a temperature of from 20° to 120° C., preferably at a temperature of from 40° to 100° C. and more preferably at a temperature of from 50° to 80° C. The polymerization can be carried out under normal pressure, or particularly in the case of gaseous monomers, under elevated pressure. The methods of addition known to those skilled in the polymerization art can be used. Thus, it is possible to prepare an emulsion in the reaction vessel and then to carry out the polymerization. However, the monomers, auxiliaries, or the preformed emulsion may be added continuously or in batches during the polymerization.

EXAMPLES

1. Emulsifiers tested

Emulsifier A 2-benzyldodecanol + 16 EO
(reaction product of 1 mole 2-benzyldodecanol with 16 moles ethylene oxide; emulsifiers B–F analogous)

Emulsifier B 2-benzyldodecanol + 20 EO
Emulsifier C 2-hexyldecanol + 15 EO
Emulsifier D 2-hexyldecanol + 30 EO
Emulsifier E 2-hexyldecanol + 50 EO
Emulsifier F 2-octyldodecanol + 43 EO 2. Comparison emulsifiers Emulsifier G nonylphenol + 15 EO
Emulsifier H nonylphenol + 40 EO 3. Polymerization
3.1 Apparatus
A closed, heatable 2-liter face-ground vessel equiped with a V4A anchor stirrer (100–150 min$^1$), dropping funnel, reflux condenser and 2-liter receiver with a paddle stirrer.
3.2 Formulation Solution 1
191.54 g deionized water
1.26 g anionic emulsifier, 100%
0.50 g potassium peroxodisulfate
0.20 g borax
Solution 2

-continued

| | | |
|---|---|---|
| 287.39 g | deionized water | |
| 0.81 g | anionic emulsifier, 100% | |
| 12.00 g | nonionic emulsifier, 100% | |
| 1.90 g | potassium peroxodisulfate | |
| 2.10 g | borax | |
| Solution 3 | | |
| 330.10 g | vinylacetate | |
| 143.50 g | versatic acid vinyl ester (VeoVa-10, Shell) | |
| 4.80 g | acrylic acid | |
| For subsequent neutralization: | | |
| 23.90 g | ammonium carbonate, 10% in water | |

3.3 Procedure

The components of solution 1 were introduced into the reaction vessel, purged with nitrogen for 30 minutes while stirring and then heated to 80° C. During the heating phase, the pre-emulsion was prepared in the receiver by adding monomer solution 3 to solution 2 with stirring of the aqueous phase. The pH value of this pre-emulsion is from 3.8 to 4.0. When the temperature inside the reactor reaches 80° C., the monomer pre-emulsion was added over a period of from 2 to 2.5 hours. On completion of the addition, the temperature of the reaction mixture was kept at 80° C. for another 2 hours. The dispersion was then cooled and filtered and the pH-value adjusted to approximately 7 with a 10% ammonium carbonate solution. 4. Test methods 4.1 Coagulate content after production The dispersion produced was poured through a tared, 80 micron mesh Perlon sieve bag (Schwegmann). The sieve bag with any coagulant present was dried for 24 hours at 105° C. and the coagulate determined by differential weighing.

4.2 Determination of particle size

Determination of the mean particle size range by automatic measurement in a Nano-Sizer (Coulter Electronics).

The measured values were determined in nm by the measuring instrument. In addition to measuring the mean particle size, the Nano-Sizer provided an indication as to the polydispersity of a dispersion.

The particle size distribution of a dispersion is classified by the polydispersity index. The particle size distribution is assigned a numerical value of from 0 to 9, the numerical value 0 to 1 mean exclusively monodisperse and the numerical value 8 to 9 exclusively polydisperse.

4.3 Dry matter content

Dry residue determination balance (Sartorius), type 709301. The solids content was determined at stage 7/20 minutes drying time. The sample weight was approximately 5 g.

4.4 Viscosity

Viscosity was measured with a Brookfield RVT viscosimeter at 25° C.

4.5 Electrolyte stability 10 ml of the following salt (electrolyte) solution was added to quantities of 10 ml of the undilute dispersion: calcium chloride solution, 1% and 10%.

TABLE 1

| Test No. | Emulsifiers Anion-active co-emulsifiers | Emulsifiers Tested non-ionic emulsifier | % Dry residue of the dispersion Theor. | % Dry residue of the dispersion Pract. | % Coagulate in production Sieve bag | % Coagulate in production Wall coating | Particle size in microns Nano-Sizer | Particle size in microns Polydispersity index | pH-Value |
|---|---|---|---|---|---|---|---|---|---|
| 1 | X | + emulsifier C | 50.0 | 49.6 | <0.1 | 0.5 | 0.164 | 0-3 | 6.6 |
| 2 | X | + emulsifier D | 50.0 | 49.6 | 0.1 | 0.3 | 0.174 | 0-1 | 6.6 |
| 3 | X | + emulsifier E | 50.0 | 49.3 | 0.1 | 0.5 | 0.173 | 0-1 | 6.7 |
| 4 | X | + emulsifier G | 50.0 | 49.4 | <0.1 | 0.7 | 0.160 | 3-5 | 6.9 |
| 5 | X | + emulsifier H | 50.0 | 49.1 | <0.1 | 0.8 | 0.175 | 0-3 | 7.0 |
| 6 | X | + emulsifier F | 50.0 | 49.2 | 0.5 | 3.0 | 0.164 | 2-5 | 6.7 |
| 7 | XX | + emulsifier C | 50.0 | 49.7 | <0.1 | 0.3 | 0.169 | 2-3 | 7.0 |
| 8 | XX | + emulsifier D | 50.0 | 49.1 | 0.1 | 2.0 | 0.182 | 0-1 | 6.7 |
| 9 | XX | + emulsifier E | 50.0 | 49.0 | 0.1 | 1.3 | 0.185 | 0-2 | 6.7 |
| 10 | XX | + emulsifier G | 50.0 | 49.2 | 0.5 | 1.0 | 0.188 | 0-3 | 6.9 |
| 11 | XX | + emulsifier H | 50.0 | 49.0 | 0.1 | 1.0 | 0.172 | 0-5 | 6.9 |
| 12 | XX | + emulsifier F | 50.0 | 49.0 | 0.5 | 3.5 | 0.186 | 0-3 | 6.7 |
| | XX | + emulsifier A | 50.0 | 49.3 | 0.1 | 1.0 | 0.180 | 0-3 | 6.9 |
| | XX | + emulsifier B | 50.0 | 49.1 | 0.1 | 1.2 | 0.170 | 0-2 | 6.9 |

X anionic co-emulsifier: a mixture of an α-sulfofatty acid, di-Na—salt with an α-sulfofatty acid ester, Na—salt
XX anionic co-emulsifier: sulfosuccinic acid semiester of a fatty alcohol polyglycolether, di-Na—salt

TABLE 2

| Test No. | Emulsifiers Anion-active co-emulsifiers | Emulsifiers Tested non-ionic emulsifier | Brookfield viscosity at 25° C. Spindle | Brookfield viscosity at 25° C. Min.$^{-1}$ | Brookfield viscosity at 25° C. mPa.s | % Coagulate in electrolyte stability test in Calcium chloride solution 1 percent | % Coagulate in electrolyte stability test in Calcium chloride solution 10 percent | MFT °C. |
|---|---|---|---|---|---|---|---|---|
| 13 | X | + emulsifier C | 1 | 20 | 110.0 | 0 | 0 | 14 |
| 14 | X | + emulsifier D | 1 | 20 | 97.5 | 0 | 0 | 14 |
| 15 | X | + emulsifier E | 1 | 20 | 82.5 | 0 | 0 | 14 |
| 16 | X | + emulsifier G | 1 | 20 | 87.5 | 0 | 0 | 14 |
| 17 | X | + emulsifier H | 1 | 20 | 92.5 | 0 | 0 | 14 |
| 18 | X | + emulsifier F | 1 | 20 | 72.5 | 0 | 0 | 14 |
| 19 | XX | + emulsifier C | 1 | 20 | 97.5 | 0 | 0 | 13 |
| 20 | XX | + emulsifier D | 1 | 20 | 65.0 | 0 | 0 | 14 |
| 21 | XX | + emulsifier E | 1 | 20 | 67.5 | 0 | 0 | 14 |
| 22 | XX | + emulsifier G | 1 | 20 | 82.5 | 0 | 0 | 13 |
| 23 | XX | + emulsifier H | 1 | 20 | 80.0 | 0 | 0 | 14 |
| 24 | XX | + emulsifier F | 1 | 20 | 55.0 | 0 | 0 | 14 |
| 25 | XX | + emulsifier A | 1 | 20 | 93.0 | 0 | 0 | 14 |

TABLE 2-continued

| Test No. | Emulsifiers Anion-active co-emulsifiers | Tested non-ionic emulsifier | Brookfield viscosity at 25° C. Spindle | Min.$^{-1}$ | mPa.s | % Coagulate in electrolyte stability test in Calcium chloride solution 1 percent | 10 percent | MFT °C. |
|---|---|---|---|---|---|---|---|---|
| 26 | XX | + emulsifier B | 1 | 20 | 86.5 | 0 | 0 | 14 |

X anionic co-emulsifier: a mixture of an α-sulfofatty acid, di-Na—salt with an α-sulfofatty acid ester, Na—salt
XX anionic co-emulsifier: sulfosuccinic acid semiester of a fatty alcohol polyglycolether, di-Na—salt

What is claimed is:

1. An emulsion polymerization composition comprising:
   A. At least one polymerizable ethylenically unsaturated monomer, and
   B. An emulsifying effective quantity of at least one reaction product of a $C_{12}$–$C_{36}$ 2-benzyl-1-alkanol with from 1 to 100 moles, per mole of alkanol, of ethylene oxide and/or propylene oxide.

2. The composition of claim 1 wherein in B the $C_{12}$–$C_{36}$ 2-benzyl-1-alkanol portion of the at least one reaction product contains from 8 to B 20 carbon atoms in its main chain.

3. The composition of claim 1 wherein in B the at least one reaction product contains from 5 to 80 moles of ethylene oxide or from 5 to 80 moles of ethylene oxide and from 1 to 20 moles of propylene oxide.

4. The composition of claim 3 wherein from 8 to 50 moles of ethylene oxide are present.

5. The composition of claim 1 wherein from about 0.1 to about 10% by weight, based on the weight of the composition, of component B is present therein.

6. The composition of claim 5 wherein from about 0.5 to about 5% by weight of component B is present therein.

7. The composition of claim 1 wherein component A is one or more of an olefin, a halogen olefin, an ester of a polymerizable unsaturated carboxylic acid, or an amide of a polymerizable unsaturated carboxylic acid.

8. In a process of carrying out the emulsion polymerization of at least one ethylenically unsaturated monomer, the improvement wherein an emulsifying effective quantity of at least one reaction product of a $C_{12}$–$C_{36}$ 2-benzyl-1-alkanol with from 1 to 100 moles, per mole of alkanol, of ethylene oxide and/or propylene oxide is present therein.

9. The process of claim 8 wherein the $C_{12}$–$C_{36}$ 2-benzyl-1-alkanol portion of the at least one reaction product contains from 8 to 20 carbon atoms in its main chain.

10. The process of claim 8 wherein the at least one reaction product contains from 5 to 80 moles of ethylene oxide or from 5 to 80 moles of ethylene oxide and from 1 to 20 moles of propylene oxide.

11. The process of claim 10 wherein from 8 to 50 moles of ethylene oxide are present.

12. The process of claim 8 wherein from about 0.1 to about 10% by weight, based on the weight of the emulsion, of the at least one reaction product is present therein.

13. The process of claim 12 wherein from about 0.5 to about 5% by weight is present therein.

14. The process of claim 8 wherein the at least one ethylenically unsaturated monomer is one or more of an olefin, a halogen olefin, an ester of a polymerizable unsaturated carboxylic acid, or an amide of a polymerizable unsaturated carboxylic acid.

* * * * *